US 7,676,529 B2

(12) United States Patent
Del Riccio, Jr. et al.

(10) Patent No.: US 7,676,529 B2
(45) Date of Patent: Mar. 9, 2010

(54) SYSTEM AND METHOD FOR EFFICIENT RECTANGULAR TO POLAR SIGNAL CONVERSION USING CORDIC ALGORITHM

(75) Inventors: John Emedio Del Riccio, Jr., Union, NJ (US); Harald Alexander Wougk, Whitehouse Station, NJ (US); Anthony Frank Migliaccio, Toms River, NJ (US)

(73) Assignee: Pine Valley Investments, Inc., Las Vegas, NV (US)

( * ) Notice: Subject to any disclaimer, the term of this patent is extended or adjusted under 35 U.S.C. 154(b) by 1008 days.

(21) Appl. No.: 11/399,272

(22) Filed: Apr. 5, 2006

(65) Prior Publication Data

US 2007/0237255 A1   Oct. 11, 2007

(51) Int. Cl.
*G06F 7/548* (2006.01)
(52) U.S. Cl. ...................................... 708/200
(58) Field of Classification Search ........................ None
See application file for complete search history.

(56) References Cited

U.S. PATENT DOCUMENTS 4,584,541 A    4/1986  Nossen (Continued)

FOREIGN PATENT DOCUMENTS

EP    0 935 386 A1    8/1999

OTHER PUBLICATIONS

Hariyama M et al: "A Collision Detection Processor for Intelligent Vehicles" IEICE Transactions on Electronics, Electronics Society, Tokyo, JP, vol. E76-C, No. 12, Dec. 1, 1993, pp. 1804-1811, XP000426743 ISSN: 0916-8524 figures 9,11.

(Continued)

*Primary Examiner*—David H Malzahn
(74) *Attorney, Agent, or Firm*—Darby & Darby PC; Robert J. Sacco (57) ABSTRACT

A system and method is provided for converting an input signal from a sequence of rectangular coordinate pairs to a sequence of polar coordinate pairs. The input signal includes a sequence of input vectors each including a pair of rectangular coordinates. A plurality of N input registers is configured to store an input vector of the input signal. The system includes a plurality of N CORDIC algorithm instances, each in communication with a corresponding one of the N input registers. Each CORDIC algorithm instance is configured to receive the input vector stored in the corresponding input register and to convert the received input vector to a corresponding output vector including a pair of polar coordinates. A recombiner is configured to receive the N output vectors and to recombine at least the N output vectors in sequence to form an output signal.

17 Claims, 4 Drawing Sheets

U.S. PATENT DOCUMENTS

| | | | |
|---|---|---|---|
| 5,418,818 | A | 5/1995 | Marchetto et al. |
| 5,490,172 | A | 2/1996 | Komara |
| 5,524,286 | A | 6/1996 | Chiesa et al. |
| 5,812,607 | A | 9/1998 | Hutchinson, IV et al. |
| 6,389,078 | B1 | 5/2002 | Hessel et al. |
| 6,653,909 | B2 | 11/2003 | Nielsen |
| 6,874,006 | B1 * | 3/2005 | Fu et al. ............... 708/442 |
| 7,349,490 | B2 * | 3/2008 | Hunton ............... 375/296 |
| 7,354,186 | B2 * | 4/2008 | Westemeyer et al. ....... 362/640 |
| 7,502,422 | B2 * | 3/2009 | Dennis et al. .......... 375/295 |
| 2003/0016762 | A1 | 1/2003 | Martin et al. |
| 2003/0031268 | A1 | 2/2003 | Wight |
| 2004/0192229 | A1 | 9/2004 | Morris et al. |
| 2004/0208259 | A1 * | 10/2004 | Hunton ............... 375/296 |
| 2005/0157636 | A1 * | 7/2005 | Wen et al. ............. 370/203 |
| 2005/0216540 | A1 * | 9/2005 | Wen et al. ............. 708/200 |
| 2007/0211829 | A1 * | 9/2007 | Liang et al. ............ 375/320 |
| 2008/0253481 | A1 * | 10/2008 | Rivkin et al. ........... 375/316 |

OTHER PUBLICATIONS

Janiszewski I et al: "VHDL-based design and design methodology for reusable high performance direct digital frequency synthesizers" Proceedings of the 38th. Annual Design Automation Conference. (DAC). Las Vegas, NV, Jun. 18-22, 2001, Proceedings of the Design Automation Conference, New York, NY: ACM, US, vol. Conf. 38, Jun. 18, 2001, pp. 573-578, XP010552453 ISBN: 1-58113-297-2 figure 1 section 3.2.1.

Volder J E: "The Cordic Trigonometric Computing Technique" IRE Transactions on Electronic Computers, IEEE Inc. New York, US, vol. EC-8, No. 3, Sep. 1, 1959, pp. 330-334, XP000565555 abstract.

* cited by examiner

SYSTEM AND METHOD FOR EFFICIENT RECTANGULAR TO POLAR SIGNAL CONVERSION USING CORDIC ALGORITHM

FIELD OF THE INVENTION

The invention relates generally to systems and methods for converting digital representations of electromagnetic signals from a rectangular format to a polar format, and more particularly to methods and apparatuses for efficient conversion using a CORDIC algorithm.

BACKGROUND OF THE INVENTION

Electromagnetic waves and signals (hereinafter "signals") are utilized for many different purposes. For example, electromagnetic signals may be processed in order to convey information, such as by attenuating and/or amplifying electromagnetic wave characteristics, for instance, as is seen when modulating the amplitude, frequency or phase of an electrical current or radio frequency (RF) wave to transmit data. As another example, power may be conveyed along a wave in a controlled fashion by attenuating and/or amplifying electromagnetic signals, such as is seen when modulating voltage or current in a circuit. Moreover, the uses may be combined, such as when information may be conveyed through a signal by processing power characteristics.

Electromagnetic signal processing may be accomplished through digital or analog techniques. Digital and analog attenuation and/or amplification also may be combined—that is, the same wave form may be subject to various types of digital and/or analog attenuation and/or amplification within a system in order to accomplish desired tasks. Other types of processing also may be used to modify electromagnetic signals, including pre-distortion, various types of modulation, etc.

For purposes of signal processing, and particularly for digital signal processing, electromagnetic signals may be represented in various ways. For example, a signal may be represented as a sequence of vectors indicative of the amplitude and phase of the signal. The vectors may be represented using various coordinate systems, including rectangular coordinates and polar coordinates.

Using rectangular coordinates, a particular vector V may be represented as the vector coordinate pair (x,y), where "x" represents the vector component in the x direction (i.e., along the x-axis), and "y" represents the vector component in they direction (i.e, along the y-axis.). In a related form of representation, rectangular coordinates are sometimes represented as "IQ" data, wherein a particular vector V may be represented as the complex number I+jQ. In this case, "I" represents the vector component in the x direction, and "Q" represents the vector component in they direction. For simplicity, IQ data may simply be denoted as (I,Q), which is the same as the (x,y) notation discussed above.

Polar coordinates also are useful in representing electromagnetic signals. In the case of polar coordinates, a particular vector V may be represented as the vector coordinate pair $(\rho,\Theta)$, where "$\rho$" represents the magnitude of the vector and "$\Theta$" represents the angle of the vector from the x-axis.

Sometimes it is useful to convert the vector representation of a signal from rectangular coordinates to polar coordinates. One way of accomplishing this conversion is to use a CORDIC algorithm. (The "CORDIC" acronym is taken from "COordinate Rotation DIgital Computer"). CORDIC algorithms convert a 2-dimensional vector (x,y) from rectangular coordinates into polar coordinates $(\rho,\Theta)$. The algorithms accomplish this by performing a successive approximation operation that rotates the vector asymptotically toward the x-axis. After a certain number of iterations, the polar angle coordinate, $\Theta$, may be determined based on the angle by which the vector has been rotated, and polar magnitude coordinate, $\rho$, may be determined based on the point at which the rotated vector ends on (or near) the x-axis.

The number of iterations required of a CORDIC algorithm depends on the bit width of the input vector and the desired accuracy of the final calculation. A disadvantage of known CORDIC algorithms is that, as the number of iterations increases, so does the amount of time required to complete each vector conversion. This results in a propagation delay between receipt of the rectangular input vector and output of the converted polar vector.

Another disadvantage of known CORDIC algorithms is that the algorithm must complete the conversion of one input vector (including all necessary iterations) before it may begin the conversion of the next input vector in the sequence. If the propagation delay is longer than the sampling period of the input signal, then the overall propagation delay between the input signal and the output signal will grow with each additional input vector conversion. In certain practical applications, such as high-speed communication systems, this increasing propagation delay is undesirable.

Accordingly, there is a need for systems and methods that provide efficient conversion of signal vectors from rectangular coordinates to polar coordinates. There also is a need for systems and methods that provide high-speed rectangular to polar conversion without excessive propagation delays.

BRIEF SUMMARY

According to one aspect of the invention, there is a system for processing an input signal including a sequence of input vectors, each input vector including a pair of rectangular coordinates. A first input register is configured to store a first input vector of the input signal, and a second input register is configured to store a second input vector of the input signal. A first instance of a CORDIC algorithm instance configured to receive the first input vector and to convert the first input vector to a first output vector including a first pair of polar coordinates. A second instance of a CORDIC algorithm is configured to receive the second input vector and to convert the second input vector to a second output vector including a second pair of polar coordinates. A recombiner is configured to receive the first and second output vectors and to combine at least the first and second output vectors in sequence to form an output signal.

According to another aspect of the invention, there is a system for processing an input signal including a sequence of at least N input vectors, where N$\geq$2, and wherein each input vector includes a pair of rectangular coordinates. Each of a plurality of N input registers is configured to store an input vector of the input signal. The system includes a plurality of N CORDIC algorithm instances, each in communication with a corresponding one of the N input registers. Each CORDIC algorithm instance is configured to receive the input vector stored in the corresponding input register and to convert the received input vector to a corresponding output vector including a pair of polar coordinates. A recombiner is configured to receive the N output vectors and to recombine at least the N output vectors in sequence to form an output signal.

According to another aspect of the invention, there is a method for processing an input signal including a sequence of at least N input vectors, where N$\geq$2, and wherein each input vector includes a pair of rectangular coordinates. A plurality of N CORDIC algorithm instances are instantiated. Each of the first N input vectors is processed using one of the N CORDIC algorithm instances, wherein the nth CORDIC algorithm instance converts the nth input vector to an nth output vector including an nth pair of polar coordinates, and wherein $1 \leq n \leq N$. At least the N output vectors are combined in sequence to form an output signal.

Other methods, apparatus, systems, features, and advantages of the invention will be, or will become, apparent to one with skill in the art upon examination of the following figures and detailed description. It is intended that all such additional systems, methods, features and advantages be included within this description.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PRESENTLY PREFERRED EMBODIMENTS

Embodiments of the invention include systems, methods, and articles of manufacture for processing electromagnetic waves and signals. For illustration purposes, an exemplary embodiment comprises a signal processor for converting a sequence of rectangular coordinate input vectors to a sequence of polar coordinate output vectors. The systems and methods described in this application may be implemented in a wide range of applications, such as, for example, a digital signal processor, a baseband processor, a phase, frequency, or amplitude modulator, an amplifier, a transmitter, a receiver, etc. For purposes of illustration, an exemplary transmitter, including a phase modulator according to one aspect of the invention, is illustrated in FIG. 1.

Figure 1:
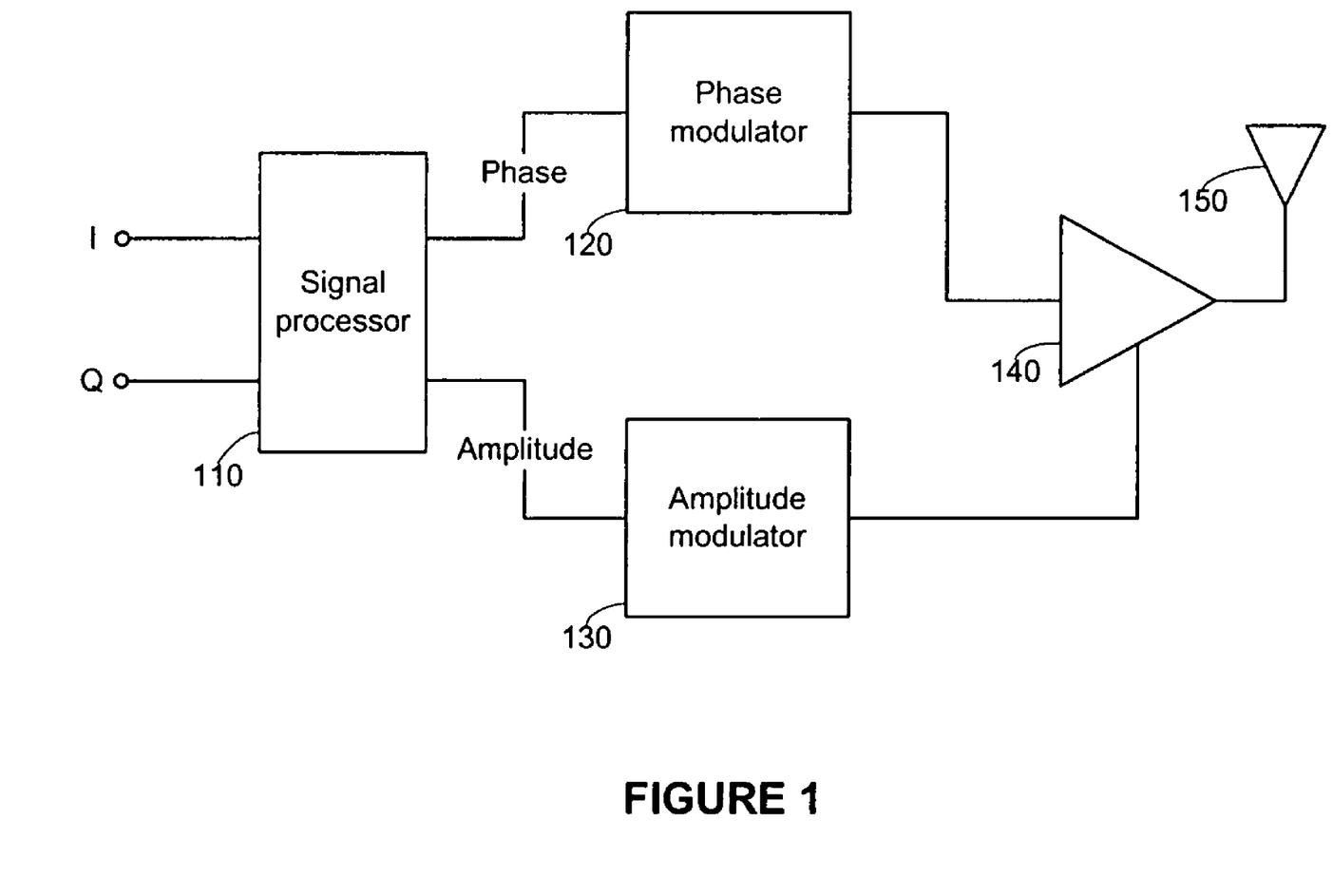
FIG. 1 is a block diagram illustrating a transmitter including a signal processor according to one aspect of the invention.

One example of a transmitter according to one aspect of the invention is illustrated in FIG. 1. The transmitter 100 includes a signal processor 110, a phase modulator 120, an amplitude modulator 130, a power amplifier 140, and an antenna 150. The various components of the exemplary transmitter 100, which are described in more detail below, may be analog or digital in nature. The exemplary transmitter 100 also may include a combination of analog and digital components.

The term "signal," as is used herein, should be broadly construed to include any manner of conveying data from one place to another, such as, for example, an electric current or electromagnetic field, including without limitation, a direct current that is switched on and off or an alternating-current or electromagnetic carrier that contains one or more data streams. Data, for example, may be superimposed on a carrier current or wave by means of modulation, which may be accomplished in analog or digital form. The term "data" as used herein should also be broadly construed to comprise any type of intelligence or other information, such as, for example and without limitation, audio, video, and/or text information.

CORDIC algorithms convert a 2-dimensional vector from rectangular coordinates (x,y) into polar coordinates ($\rho,\Theta$). The algorithm typically begins by detecting which of the four quadrants contains the vector. If the vector resides in either the upper left quadrant or the lower left quadrant, then the algorithm maps the vector into the upper right quadrant or the lower right quadrant, respectively. The algorithm then applies a successive approximation operation on the vector, which rotates the vector asymptotically toward the x-axis. After N iterations, the algorithm terminates. The distance moved from the location of the original vector to the x-axis becomes the polar angle coordinate, $\Theta$, and the point at which the vector terminates on (or near) the x-axis becomes the polar magnitude coordinate, $\rho$. It may also be necessary to factor the inherent CORDIC gain out of the polar magnitude coordinate, as is known in the art.

The number of iterations required, N, depends on the bit width of the input vector and the desired accuracy of the final calculation. The accuracy may be defined as the asymptotic proximity of the final rotated vector to the x-axis. Each iteration of the algorithm requires a determination of which quadrant contains the current rotated vector (i.e., the upper right quadrant or the lower right quadrant), which is required to determine the direction in which the vector must be rotated to move it toward the x-axis. As a result, the complexity of the overall logic increases with each additional iteration of the algorithm. This has a negative impact on the speed of the conversion, which requires more time to provide more accuracy.

For a given vector bit-width, b, and a given number of CORDIC iterations, N, the maximum processing frequency, $f_{max}$, is a function of the propagation delay, $p_{del}$. This is because all of the iterations for a given conversion must be performed before a final converted polar coordinate vector may be obtained. The relationship between $f_{max}$ and $p_{del}$ is defined as:

$$f_{max} = \frac{1}{p_{del}}$$

When $p_{del}$ becomes so large as to restrict $f_{max}$, a parallel processing/recombining scheme significantly increases the CORDIC conversion performance. The significant increase in performance may be realized by instantiating multiple (i.e., N) instances of the CORDIC algorithm to process input vectors in parallel, and then recombining the output of the multiple algorithms in the proper sequence to form the output signal. For example, for a desired maximum frequency, $f_{desired}$, and with a constant propagation delay, $p_{del}$, the desired number of instances of the CORDIC algorithm, N, may be defined as:

$$N = (p_{del} + p_{del}') \times f_{desired}, \text{ where } p_{del} \square p_{del}$$

The factor $p_{del}'$ is an additional propagation delay caused by the necessary recombining circuitry. This additional delay is generally small compared to the propagation delay $p_{del}$ of the CORDIC algorithm.

As a practical matter, there may be bounds on the number, N, of CORDIC algorithms that may be instantiated in parallel. For example, a large number of CORDIC algorithms may exceed the loading limits of the input and output circuitry, which may slow down the input and output signal processing. However, within these bounds, the use of multiple parallel CORDIC algorithms can provide significant increases in performance compared to the use of a single instance of a CORDIC algorithm.

As illustrated in FIG. 1, the signal processor 110 may be, for example, a digital signal processor, such as a digital signal processor capable of generating a power control signal and a data control signal in response to the input signal. The input signal, may be, for example, a baseband signal. Electrical power may be regulated by the data control signal in order to generate an output signal for transmission that is an amplified version of the input signal.

The signal processor 110 converts the vectors of native I,Q data from rectangular coordinates into polar coordinates to create a data control signal that contains the amplitude component of the input signal, and an electromagnetic signal that contains the phase component of the input signal. The signal processor 110 uses the CORDIC algorithm discussed above to output polar coordinates, for example, in the form R, P(sin) and P(cos). The R coordinate represents the amplitude component of the input signal, and the P(sin) and P(cos) coordinates represent the phase component of the signal.

The amplitude and phase components of the input signal are then transmitted through separate paths to power amplifier 140. For example, the amplitude component of the original input signal may be modulated by optional amplitude modulator 130 as a series of digital pulses comprising a digital word quantized into bits $B_0$ to $B_{N-1}$ with a most significant bit and a least significant bit. The digital word may be of varying lengths in various embodiments.

The phase component, in turn, may be processed separately by optional phase modulator 120 and then applied to power amplifier 140. For example, the phase component may be modulated by the phase modulator 120 to yield an on-channel, phase modulated carrier. The phase modulated carrier may then be provided to the power amplifier 140. The power amplifier 140 may then combine the phase modulated carrier with the amplitude component to generate a fully-modulated carrier with the required output power signal level.

Figure 2:
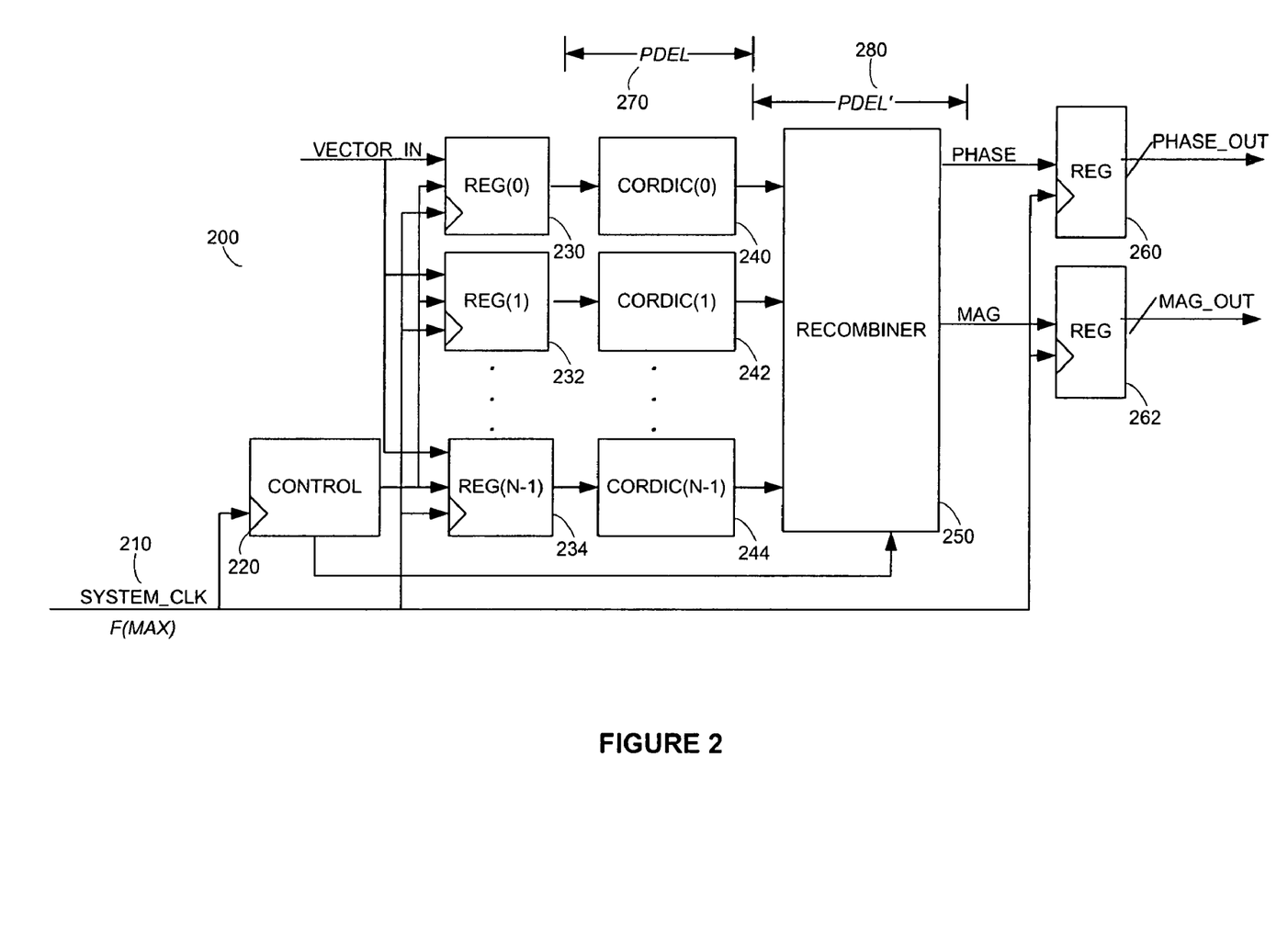
FIG. 2 is a block diagram illustrating a signal processor for converting the vectors of an input signal from rectangular to polar coordinates according to another aspect of the invention.

FIG. 2 is a block diagram illustrating a signal processor 100 for converting the vectors of an input signal from rectangular to polar coordinates according to another aspect of the invention. The signal processor 200 is one example of a signal processor 110 for use with the transmitter 100 shown in FIG. 1. The signal processor 200 may be implemented in a variety of architectures. For example, the signal processor may be implemented using logic instructions programmed on a dedicated, special-purpose digital signal processing device. As another example, the signal processor may be implemented using logic instructions programmed along with various other applications on a general purpose microprocessor.

The signal processor 200 includes a system clock 210, which provides a period clock signal for timing of operations. Alternatively, the signal processor 200 may receive a clock signal from an external system clock. The signal processor 200 also includes a controller or control unit 220, which controls operation of the signal processor 200 based in part on the clock signal from the system clock 210. One function of the controller 220 is to provide particular input vectors to particular input registers by controlling the input of each vector from the input signal, VECTOR_IN, to one of the N input registers 230, 232, 234. Each of the input vectors includes a pair of rectangular coordinates, (x,y). For convenience, only three input registers 230, 232, 234 are shown in FIG. 2. In practice, however, the signal processor 200 may include any desired number, N, of input registers, as discussed in more detail below.

The controller 220 may control selection and routing of the input vectors in various ways. For instance, as illustrated in FIG. 2, the controller 220 may send control signals along control lines to each of the input registers 230, 232, 234. In accordance with the control signals and the clock signal from the system clock 210, each of the input registers 230, 232, 234 enables its input port at the appropriate time to receive the appropriate input vector from the input signal. The input registers 230, 232, 234 store the input vectors for purposes of the CORDIC conversion.

Each of the input registers 230, 232, 234 is in communication with one of N instances 240, 242, 244 of a CORDIC algorithm. Each of these CORDIC algorithm instances 240, 242, 244 is instantiated separately to enable parallel conversion of successive input vectors. For convenience, only three CORDIC algorithm instances 240, 242, 244 are shown in FIG. 2. In practice, however, the signal processor 200 may include any desired number, N, of CORDIC algorithm instances, as discussed in more detail below.

Each of the CORDIC algorithm instances 240, 242, 244 is configured to receive a rectangular coordinate input vector from its associated input register 230, 232, 234. The CORDIC algorithm instances 240, 242, 244 are further configured to convert the received input vectors to polar coordinate vectors by performing a desired number of CORDIC rotation iterations. Each of the polar coordinate vectors, or output vectors, includes a pair of polar coordinates, $(\rho,\Theta)$. Upon completing the conversion of its respective input vector, each of the CORDIC algorithm instances 240, 242, 244 provides the converted polar coordinate vector to the recombiner 250.

The recombiner 250 is configured to receive converted polar coordinate output vectors from each of the N CORDIC algorithm instances 240, 242, 244 and to recombine the converted vectors in sequence to form a sequenced output signal. As illustrated in the exemplary signal processor 200 of FIG. 2, the recombiner 250 sequences the output vectors according to a control signal received from the controller 220. Alternative arrangements for sequencing the output vectors also are possible. As desired, the output signal includes the proper sequence (matched to the sequence of the input signal) of vectors converted to polar coordinates.

The recombiner 250 may provide the polar coordinate output vectors of the output signal in a variety of ways. As illustrated in FIG. 2, the recombiner 250 provides the output vectors as two component output signals, MAG and PHASE, which represent the magnitude and phase of the output signal, respectively. In this arrangement, the polar magnitude coordinate, $\rho$, of each output vector is included in the magnitude component output signal, MAG. Likewise, the polar phase coordinate, $\Theta$, of each output vector is included in the phase component output signal, PHASE.

The signal processor 200 illustrated in FIG. 2 includes two output registers 260, 262 configured to receive the magnitude and phase component output signals, PHASE and MAG, respectively. The output registers 260, 262 are further configured to temporarily store the component output signals and to provide these component output signals to other devices or systems for amplification, attenuation, further signal processing, etc., according to the particular application.

As noted above, increasing the number of CORDIC iterations for a given conversion increases both the accuracy of the conversion output and the amount of time required to perform the conversion. This amount of time may be referred to as the propagation delay, $p_{del}$. FIG. 2 illustrates the source of the CORDIC propagation delay, $p_{del}$, 270 resulting from a single vector conversion. FIG. 2 also illustrates the additional propagation delay, $p_{del}'$, 280 resulting from the recombination circuitry required to sequence the converted output vectors to form an output signal. These two separate propagation delays are included in FIG. 2 merely to illustrate the source of the delays and are not drawn to scale. In practice, the propagation delay due to recombination, $p_{del}'$, 280 typically would be small relative to the CORDIC propagation delay, $p_{del}$, 270.

Figure 3:
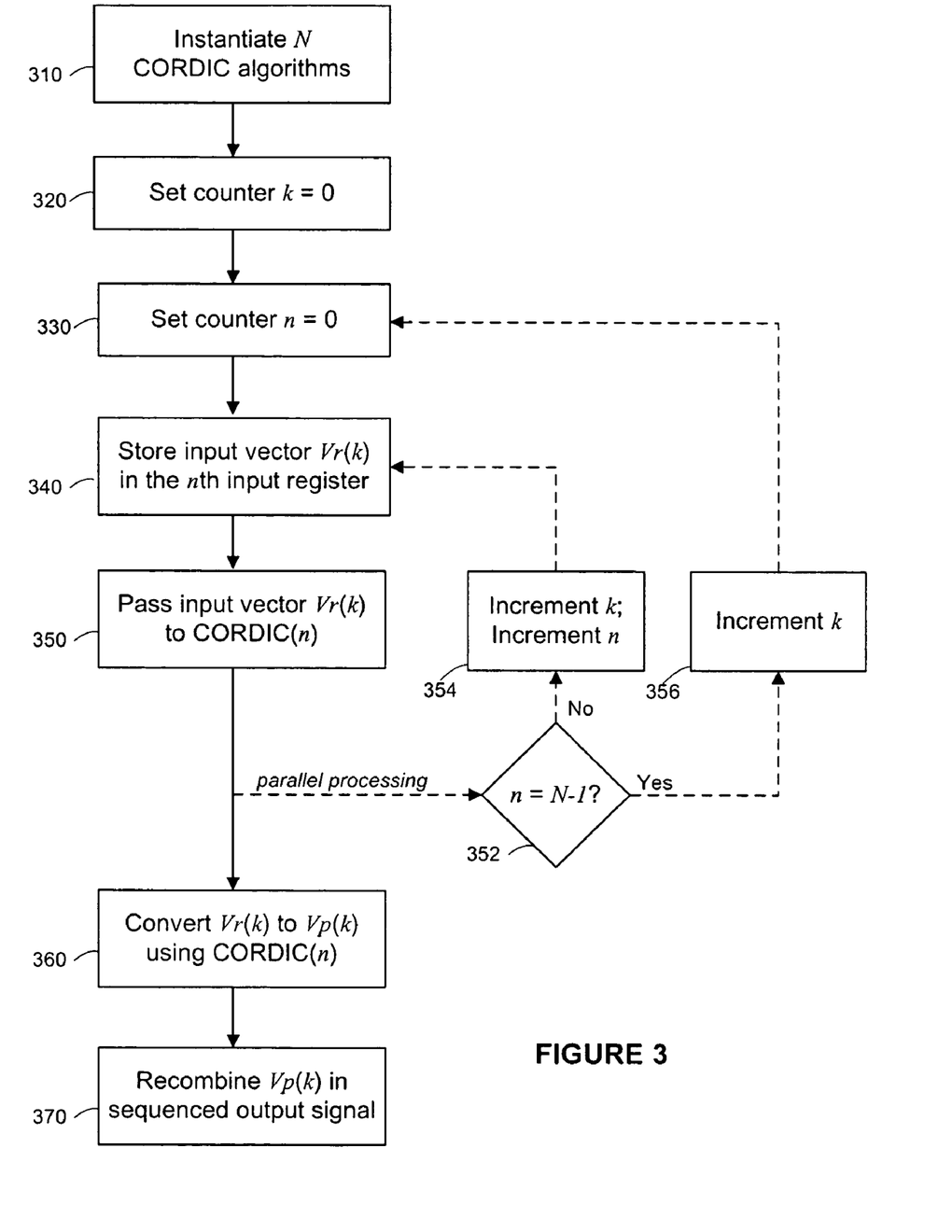
FIG. 3 is a flow diagram illustrating a method for converting the vectors of an input signal from rectangular to polar coordinates according to another aspect of the invention.

Turning now to FIG. 3, the figure is a flow diagram illustrating a method for converting the vectors of an input signal from rectangular to polar coordinates according to another aspect of the invention. As shown in FIG. 3, a desired number N CORDIC algorithms are instantiated 310. This results in N parallel CORDIC algorithm instances 240, 242, 244, as shown in FIG. 2. Typically, each instance would be of exactly the same CORDIC algorithm. However, various different known CORDIC algorithms may be used for different instances, depending on particular design parameters.

As shown in the illustrative method of FIG. 3, an index counter k is initiated and set to zero 320. The counter k is used as an index for the rectangular input vectors, $V_r(k)$, and the polar output vectors, $V_p(k)$. A second index counter n also is initiated and set to zero 330. The counter n is used to index the N CORDIC algorithm instances and to assign particular input vectors to particular input registers 230, 232, 234 and CORDIC algorithm instances 240, 242, 244. The counters k and n illustrated here are exemplary, but other counters and indexing methods may be used consistent with the invention.

As the method continues, a particular input vector, $V_r(k)$, is stored 340 in the nth input register (e.g., 230, 232, 234 in FIG. 2), based on the current values of the index counters k and n. The input vector, $V_r(k)$, is then passed 350 to a CORDIC instance, CORDIC(n), based on the current values of the index counters k and n. The CORDIC instance, CORDIC(n) converts 360 the rectangular coordinate input vector $V_r(k)$ to a polar coordinate output vector $V_p(k)$ by performing the desired number of CORDIC iterations. For example, each CORDIC instance may perform between 8 and 12 iterations of the algorithm for each conversion. The bit width of the vector representations for these conversions may be between 9 and 13 bits. The converted polar coordinate output vector $V_p(k)$ is then recombined 360 in sequence in the output signal.

In parallel to the conversion of one input vector, the next sequential input vector is loaded and passed to the next CORDIC instance. (The parallel processing in FIG. 3 is illustrated by dashed lines.) As shown in FIG. 3, after passing the input vector $V_r(k)$ to the CORDIC instance, CORDIC(n), a parallel process begins by checking 352 to determine whether the current value of the index counter n is equal to N-1, where N is the total number of CORDIC instances. If the outcome of check 352 is negative, then both of the index counters k and n are incremented 354 (i.e., k=k+1; n=n+1). The next input vector $V_r(k)$ is then stored 340 in the nth input register based on the updated values of the index counters k and n, and the process continues as described above, passing 350 the input vector $V_r(k)$ to the CORDIC instance CORDIC(n) (again, based on the updated values of k and n), converting 360 the input vector $V_r(k)$ to a polar coordinate output vector $V_p(k)$, and recombining 370 the polar output vector $V_p(k)$ in sequence in the output signal.

If the outcome of check 352 is positive, meaning that the current value of the index counter n is equal to N-1, then the method returns to using the first CORDIC instance, CORDIC (0), for the next conversion. In particular the value of the index counter k is incremented 356 (i.e., k=k+1), and the value of index counter n is again set to zero 330. The next input vector $V_r(k)$ is then stored 340 in the nth input register based on the updated values of the index counters k and n, and the process continues as described above, passing 350 the input vector $V_r(k)$ to the CORDIC instance CORDIC(n) (again, based on the updated values of k and n), converting 360 the input vector $V_r(k)$ to a polar coordinate output vector $V_p(k)$, and recombining 370 the polar output vector $V_p(k)$ in sequence in the output signal. The process illustrated in FIG. 3 is complete when the last input vector has been converted into an output vector, which is recombined into the output signal.

The desired number of CORDIC algorithm instances 240, 242, 244 may be selected depending on a variety of design factors. For instance, it may be desirable to match the number of CORDIC algorithm instances to the number of algorithm iterations performed in each CORDIC conversion. This arrangement is particularly advantageous when a single iteration of the CORDIC algorithm can be completed within one clock cycle period. This is illustrated in the timing diagram of FIG. 4.

Figure 4:
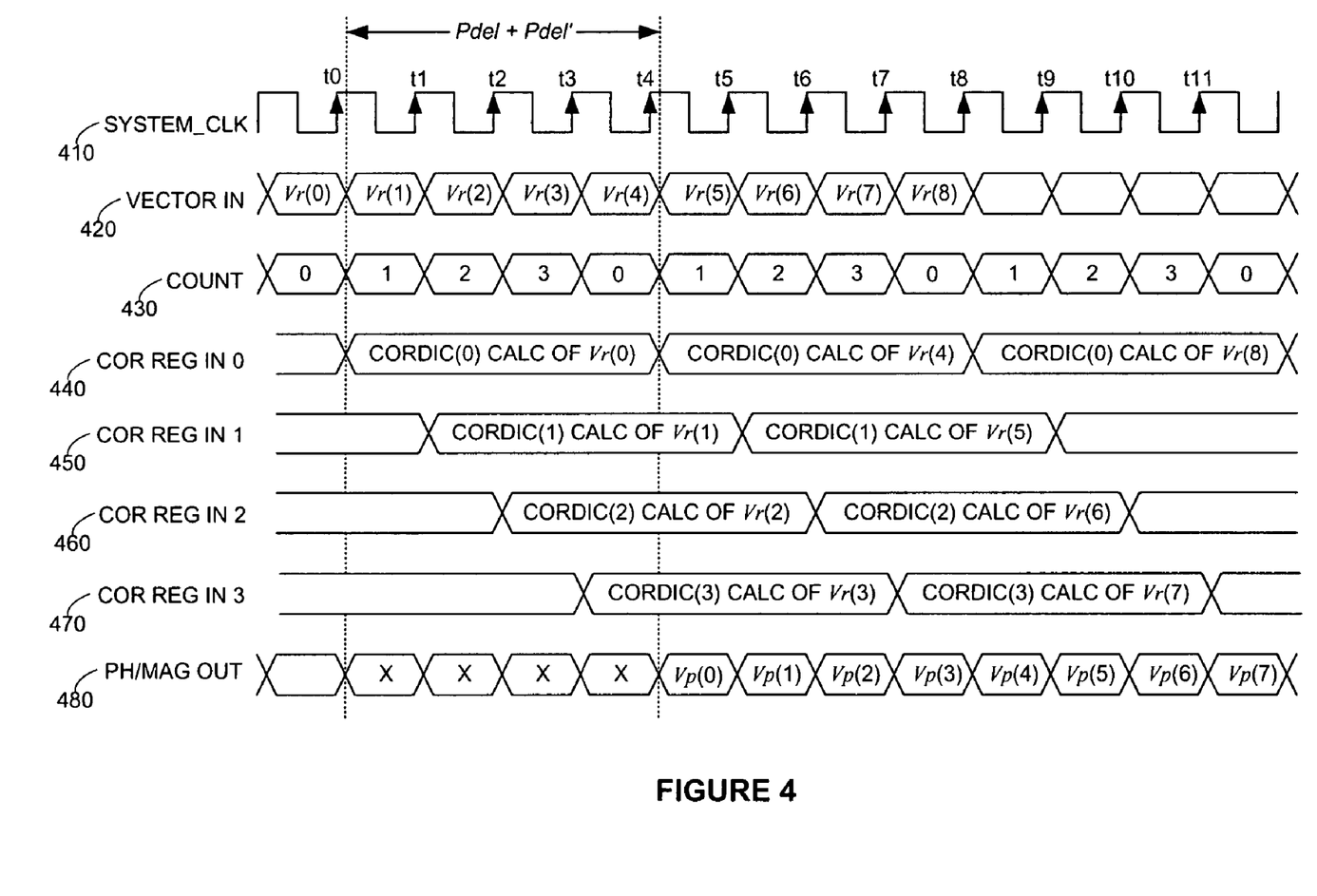
FIG. 4 is a timing diagram illustrating a method for converting the vectors of an input signal from rectangular to polar coordinates according to another aspect of the invention.

FIG. 4 is a timing diagram according to another aspect of the invention for a system running four parallel CORDIC instances, where each CORDIC instance requires four clock cycles to complete a single CORDIC conversion. The scale of the timing diagram is based on the system clock signal 410. The VECTOR IN signal 420 represents the receipt of each sequential input vector $V_r(k)$ by an input register 230, 232, 234. The COUNT signal 430 is an index counter similar to the counter n discussed above with respect to FIG. 3. The COR REG IN signals 440, 450, 460, 470 represent the time required for each of the CORDIC instances to convert particular input vectors. The PH/MAG OUT signal 480 represents the sequenced timing of the output vectors $V_p(k)$ in the output signal.

As illustrated in FIG. 4, the first input vector $V_r(0)$ is received at the first input register 230 during the clock cycle period ending at time $t_0$. The value of the index counter n at this time is zero, so the first input vector $V_r(0)$ is passed to the first CORDIC instance, CORDIC(0), for conversion. The conversion process begins during the next clock cycle period, shortly after time $t_0$.

Each conversion illustrated in FIG. 4 requires four clock cycle periods. For example, the CORDIC algorithm may perform four iterations per conversion, where a single iteration requires a single clock cycle period. (Alternatively, the CORDIC algorithm may perform two iterations per conversion, where a single iteration requires two clock cycle periods.) As a result, the first CORDIC instance, CORDIC(0), performs the conversion of the first input vector $V_r(0)$ during the four clock cycle periods between times $t_0$ and $t_4$. The converted polar coordinate output vector $V_p(0)$ is then provided shortly after time $t_4$.

In the meantime, the next input vector $V_r(1)$ is received at the next input register 232 during the clock cycle period ending at time $t_1$. The value of the index counter n at this time is one, so the input vector $V_r(1)$ is passed to the next CORDIC instance, CORDIC(1), for conversion. The conversion process begins during the next clock cycle period, shortly after time $t_1$. The CORDIC(1) instance performs the conversion of the input vector $V_r(1)$ during the four clock cycle periods between times $t_1$ and $t_5$. The converted polar coordinate output vector $V_p(1)$ is then provided shortly after time $t_5$.

This process continues in parallel, with the CORDIC(2) and CORDIC(3) instances beginning conversion of input vectors $V_r(2)$ and $V_r(3)$ before the CORDIC(0) instance completes conversion of the first input vector $V_r(0)$. In particular, the CORDIC(2) instance performs the conversion of the input vector $V_r(2)$ during the four clock cycle periods between times $t_2$ and $t_6$, and the converted polar coordinate output vector $V_p(2)$ is provided shortly after time $t_6$. Similarly, the CORDIC(3) instance performs the conversion of the input vector $V_r(3)$ during the four clock cycle periods between times $t_3$ and $t_7$, and the converted polar coordinate output vector $V_p(3)$ is provided shortly after time $t_7$.

Shortly after time $t_3$, the counter n is reset to zero. As a result, for the next conversion, the process returns to using the first input register 230 and the first CORDIC instance 240, CORDIC(0). Thus, the CORDIC(0) instance performs the conversion of the conversion of the input vector $V_r(4)$ during the four clock cycle periods between times $t_4$ and $t_8$, and the converted polar coordinate output vector $V_p(4)$ is provided shortly after time $t_8$. At the same time the CORDIC(0) instance is performing this conversion, the CORDIC(1), CORDIC(2), and CORDIC(3) instances begin in parallel to perform conversions of the input vectors $V_r(5)$, $V_r(6)$, and $V_r(7)$. This conversion process continues, cycling through the four parallel CORDIC instances, for as long as new input vectors are received.

There is a propagation delay at the beginning of the conversion process, while the first CORDIC instance, CORDIC(0), is performing the conversion of the first input vector $V_r(0)$. This propagation delay is represented in FIG. 4 as the combination of $P_{del}$ and $P_{del}'$. The total propagation delay is approximately four clock cycle periods, as shown between about times $t_1$ and $t_4$. However, this propagation delay is relatively small and does not increase with each successive conversion. As a result, after this initial propagation delay, the system provides a continuous stream of output vectors $V_p(k)$, sequenced at the same rate as the input vectors $V_r(k)$.

Certain transmitters, receivers, transceivers, and other components such as transmitter 100 and signal processors 10 and 200 may be specialized for particular input signals, carrier waves, and output signals (e.g., various types of cell phones, such as CDMA, CDMA2000, WCDMA, GSM, TDMA), as well as various other types of devices, both wired and wireless (e.g., Bluetooth, 802.11a, -b, -g, radar, 1xRTT, radios, GPRS, EDGE, computers, computer or non-computer communication devices, or handheld devices). The modulation schemes used in these environments may include, for example, GMSK, which is used in GSM; GFSK, which is used in DECT & Bluetooth; 8-PSK, which is used in EDGE; OQPSK & HPSK, which are used in IS-2000; p/4 DQPSK, which is used in TDMA; and OFDM, which is used in 802.11.

It is intended that the foregoing detailed description be regarded as illustrative rather than limiting, and that it be understood that the following claims, including all equivalents, are intended to define the scope of this invention.

The invention claimed is:

1. A system for processing an input signal including a sequence of input vectors, each input vector including a pair of rectangular coordinates, the system comprising:
   a first input register configured to store a first input vector of the input signal;
   a second input register configured to store a second input vector of the input signal;
   at least one processor communicatively coupled to said first and second input registers, said processor configured to execute:
      a first CORDIC algorithm instance operative to receive the first input vector and to convert the first input vector to a first output vector including a first pair of polar coordinates, and
      a second CORDIC algorithm instance operative to receive the second input vector and to convert the second input vector to a second output vector including a second pair of polar coordinates; and
   a recombiner in communication with the processor and configured to receive the first and second output vectors and to combine at least the first and second output vectors in sequence to form an output signal.

2. The system of claim 1, further comprising:
   a controller in communication with the first and second input registers, wherein the controller is configured to provide the first input vector to the first input register and to provide the second input vector to the second input register.

3. The system of claim 2, wherein the controller is further configured to provide a control signal to the recombiner, and wherein the recombiner is further configured to sequence the first and second output vectors in accordance with the control signal.

4. The system of claim 1, wherein each pair of output vector polar coordinates includes a magnitude coordinate and a phase coordinate, the system further comprising:
   a first output register in communication with the recombiner and configured to receive and store a magnitude component of the output signal, the magnitude component including the magnitude coordinates of the output vectors; and
   a second output register in communication with the recombiner and configured to receive and store a phase component of the output signal, the phase component including the phase coordinates of the output vectors.

5. The system of claim 1, wherein the first input vector has a bit width of between 9 and 13 bits.

6. The system of claim 1, wherein the first CORDIC algorithm instance is further operative to perform between 8 and 12 iterations in the conversion of the first input vector to a first output vector.

7. A system for processing an input signal including a sequence of at least N input vectors, where $N \geq 2$, and wherein each input vector includes a pair of rectangular coordinates, the system comprising:
   a plurality of N input registers, each configured to store an input vector of the input signal;
   at least one processor communicatively coupled to said plurality of N input registers, said processor executing a plurality of N CORDIC algorithm instances, each configured to receive the input vector stored in the corresponding input register and to convert the received input vector to a corresponding output vector including a pair of polar coordinates; and
   a recombiner in communication with said processor, wherein the recombiner is configured to receive the N output vectors and to recombine at least the N output vectors in sequence to form an output signal.

8. A system for processing an input signal including a sequence of at least N input vectors, where $N \geq 2$, and wherein each input vector includes a pair of rectangular coordinates, the system comprising:
   means for storing the input vectors of the input signal;
   means for performing a plurality of CORDIC conversions in parallel, wherein each CORDIC conversion converts one of the input vectors of the input signal to a corresponding output vector including a pair of polar coordinates;
   means for recombining the output vectors in sequence to form an output signal.

9. The system of claim 8, further comprising:
means for storing a magnitude component of the output signal, the magnitude component including the magnitude coordinates of the output vectors; and
means for storing a phase component of the output signal, the phase component including the phase coordinates of the output vectors.

10. The system of claim 8, wherein each of the input vectors has a bit width of between 9 and 13 bits.

11. The system of claim 8, wherein each CORDIC conversion includes between 8 and 12 iterations of a CORDIC algorithm.

12. A method for processing an input signal including a sequence of at least N input vectors, where $N \geq 2$, and wherein each input vector includes a pair of rectangular coordinates, the method comprising:
Creating N CORDIC algorithm instances of a CORDIC algorithm object;
processing each of the first N input vectors using one of the N CORDIC algorithm instances, wherein the nth CORDIC algorithm instance converts the nth input vector to an nth output vector including an nth pair of polar coordinates, and wherein $0 \leq n \leq N-1$; and
recombining at least the N output vectors in sequence to form an output signal.

13. The method of claim 12, wherein conversion of the nth input vector to the nth output vector includes performing N iterations of the nth CORDIC algorithm.

14. The method of claim 13, wherein a single iteration of the nth CORDIC algorithm is performed during each clock cycle period.

15. The method of claim 13, wherein at least one of the input vectors has a bit width of between 9 and 13 bits.

16. The method of claim 13, wherein the processing of each of the first N input vectors further includes performing between 8 and 12 CORDIC iterations.

17. The method of claim 13, further comprising:
beginning to process the first input vector at a time $t_0$; and
providing the first converted output vector at a time $t_N$, wherein the time $t_N$ is N clock cycle periods after the time $t_0$.

* * * * *